June 6, 1939.    C. F. HIRSHFELD    2,161,164
HUB CONSTRUCTION
Filed Oct. 26, 1936
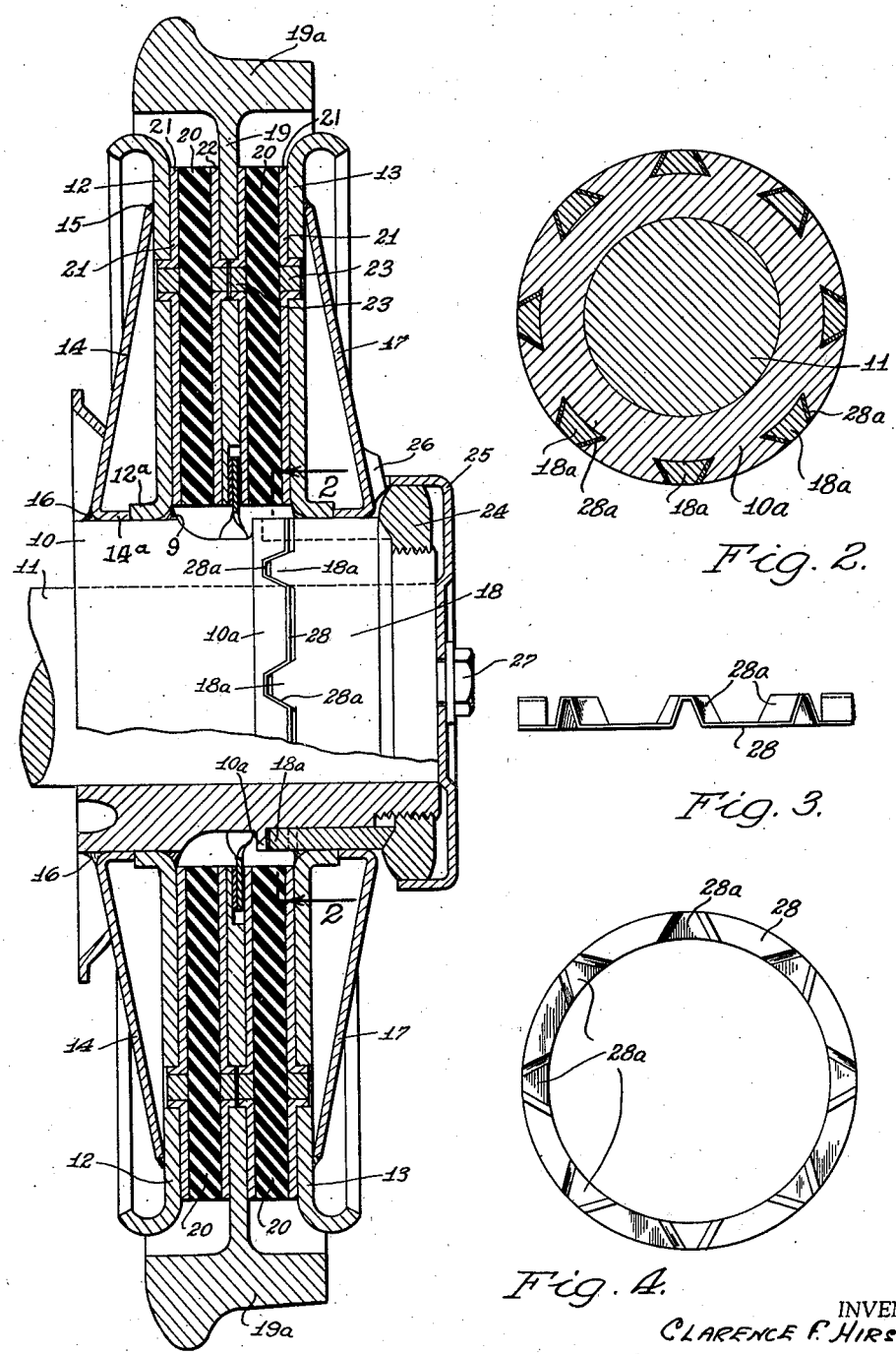
Fig. 1.   Fig. 2.   Fig. 3.   Fig. 4.
INVENTOR.
CLARENCE F. HIRSHFELD
BY
ATTORNEY.

Patented June 6, 1939

2,161,164

UNITED STATES PATENT OFFICE 2,161,164

HUB CONSTRUCTION

Clarence F. Hirshfeld, Detroit, Mich., assignor to Transit Research Corporation, New York, N. Y., a corporation of New York Application October 26, 1936, Serial No. 107,600

10 Claims. (Cl. 295—11)

This invention relates to resilient wheels of the type wherein the resiliency is provided by slabs of rubber lying perpendicular to the axis and having opposite faces connected to the hub and to the rim so that the rubber is stressed in shear by the load on the wheel. In this type of wheel, it has been found that placing the rubber slabs under substantial compression parallel to the axis of the wheel makes them better able to carry the loads imposed upon them. One of the principal objects of this invention is to provide a method of and a means for placing the rubber slabs under the proper range of compression.

Another object is to secure the parts in position to maintain the predetermined amount of compression, irrespective of whether or not the rubber slabs and other parts have exactly the designed thickness.

In the type of resilient wheels to which this invention relates, the hub is provided with a pair of load transferring plate members between which the rubber slabs are clamped with a tire carrying plate member between them. One of the load transferring members is removable to allow the wheel to be assembled and disassembled and is adjustable to permit the securing of the proper pressure on the rubber slabs. Another object of this invention is to provide means for rigidly securing this removable member to the hub so that it is tightly clamped against movement in any direction. Another object of this invention is to provide means for clamping the removable member in such a way that there will be no movement of it with respect to the hub which is not resisted, not only by friction, but by abutting surfaces, that is, by surfaces at an angle to the direction of the motion which they prevent. Thus the removable member will be positively held independently of friction. Another object of this invention is to provide means for clamping the removable member in such a way that, as the clamping means are tightened up, all clearances at the places where the loads are transmitted are taken up and the parts pressed tightly against each other so that no movement and consequent wear can occur, and so that the rigidity of the assembly does not depend upon the accuracy of the fit of the parts.

These and other objects and advantages will hereinafter become more fully apparent as reference is had to the accompanying drawing wherein:

Figure 1 is a sectional view, taken through the axis, of one of the preferred embodiments of my invention, Figure 2 is a sectional view on the line 2—2 of Figure 1, looking in the direction of the arrows.

Figure 3 is an edge view of one form of shim that may be used in the embodiment of my invention shown in Figure 1.

Figure 4 is a plan view of the shim shown in Figure 3.

The embodiment of the invention shown in the drawing comprises a hub 10 pressed onto the end of an axle 11 and having two circular cheek plates 12 and 13 radiating therefrom. The cheek plate 12 nearest the center of the axle 11 has a central flange 12a fitting over the hub 10, the base of the flange 12a being welded to the hub 10 at 9 to permanently secure them together. In addition, the cheek plate 12 is supported by frusto-conical bracing plate 14 whose concave side faces the outer face of the cheek plate 12, the periphery of the bracing 14 being welded to the cheek plate 12 at 15. The center of the bracing plate 14 is formed into a collar or flange 14a fitting over the inner end of the hub 10 and is welded thereto at 16.

The other cheek plate 13 is similarly formed and provided with a similar bracing plate 17 welded thereto, but this cheek plate 13 and bracing plate 17, instead of being welded to the hub 10, are welded to a sleeve 18 which slides over the outer end of the hub 10 so that they can be removed. The outer end of the hub 10 is smaller in diameter than the inner end, allowing the sleeve 18 which fits over it to have the same outside diameter as the inner end of the hub and permitting the two cheek plates 12 and 13 and the two bracing plates 14 and 17 to be duplicates.

The sleeve 18 is prevented from rotating with respect to the hub by having its end notched or castellated, the resulting teeth 18a fitting into notches in a shoulder 10a on the hub 10. The teeth 18a are tapered or are roughly triangular in shape so that when they are pressed into the notches in the shoulder 10a their sides will be pressed tightly against the sides of the notches, thus locking the sleeve 18 both against rotation and against endwise movement. In addition, the sides of the notches are undercut and the sides of the teeth 18a are bevelled to fit, so that when the teeth 18a are forced into the notches the undercut and bevelled surfaces tend to force each tooth 18a towards the axis of the hub 10. Thus the lateral surfaces of the teeth and notches not only serve to positively position the sleeve 18 axially and circumferentially but also serve to positively center the sleeve 18 and the hub 10 irrespective of the clearance between them. The sleeve 18 is held with its teeth 18a tightly in the notches in the shoulder 10a on the hub by a ring-like nut 24 screwed onto the end of the hub 10. The outer end of the sleeve 18 and the cooperating face of the nut 24 which fits against it are conical so that the nut 24 will positively center that end of the sleeve 18 on the hub 10. This feature, in connection with the tapered and bevelled teeth 18a, positively locks the sleeve 18 against moving in any direction irrespective of the clearances that may be provided to facilitate assembly. The nut 24 is locked by a cap 25 whose interior is shaped to fit the sides of the nut 24. The cap 25, in turn, is prevented from rotating by a slot in its edge which engages a lug 26 on the adjacent bracing plate 17 and is held in place by a small bolt 27 extending into the end of the axle 11.

A central plate or web 19 lies midway between the two cheek plates 12 and 13 and carries a tire 19a formed integrally with it. A large aperture in the middle of the central plate 19 allows the hub 10 to pass through it with considerable clearance. This ensures that the central plate and hub will never be in direct contact but that the load will at all times be transmitted in shear from the central plate 19 to the cheek plates 12 and 13 through the cushioning elements 20 which lie between them.

The cushioning elements comprise circular slabs or discs of rubber 20 with thin sheets or discs 21 and 22 of metal bonded to the sides of the slabs 20 and connected to the plates 12, 13 and 19. In the embodiment of the invention illustrated, there are two slabs of rubber 20, one at each side of the central plate 19 and between it and the cheek plates 12 and 13, and they are made thick enough so that they and the central plate 19 are clamped tightly together between the cheek plates 12 and 13 when the outer cheek plate 13 and the sleeve 18 which carries it are forced into position.

The slabs of rubber 20 are surface bonded to metallic discs or sheets 21 and 22 distinct from and removably connected to the plates 12, 13 and 19 against which they lie, forming springing elements which can be easily removed in case it becomes necessary to replace them. The means for connecting the discs 21 to the cheek plates 12 and 13 and the discs 22 to the central plate or web 19 comprise composite dowels 23 projecting from the discs 21 and 22 into holes in the plates 12, 13 and 19. The dowels 23 and the holes into which they project are spaced evenly and symmetrically around the axis of the wheel.

In wheels of this general type, it is necessary to place the rubber springing elements 20 under a predetermined lateral pressure to develop the optimum load carrying characteristics of the wheel. Since the lateral pressure on the spring elements 20 compresses them very little, it is obvious that, if the teeth 18a are forced solidly into the notches in the collar 10a, slight variations from one wheel to another in the thicknesses of the rubber slabs 20 or in the distance between the cheek plates 12 and 13 will cause great variations in the pressure. To compensate for these variations in dimensions, it is desirable, in wheels having this type of hub structure, to provide shim means between the sides of the teeth 18a and the sides of the notches in the collar 10a and to vary the thickness of the shim means from wheel to wheel to provide firm abutments for the teeth 18a when the rubber springing elements are subjected to the predetermined pressure.

In the embodiment of the invention shown, the shim means comprises a shim 28 which fits between the toothed end of the sleeve 18 and the notched shoulder 10a on the hub 10. The shim 28 is of uniform thickness and is stamped out with portions 28a which fit down into and line the sides of the notches in the shoulder 10a. Thus, when a shim 28 is in place, it makes the notches narrower and moves the sleeve 18 out a little, and the position of the sleeve can be adjusted by varying the thickness of the shim.

The proper thickness of the shim 28 for each individual wheel can be determined by trial assemblies with shims of different thicknesses and by noting the force required to compress the springing elements 20 enough to secure seating of the teeth 18a with each shim. However, it is quicker to assemble the wheel with one or two short pieces of soft lead wire in place of the shim and to apply an external force equal to the predetermined pressure to the sleeve 18 and cheek plate 13. This will flatten the soft wire, and its resultant thickness, less a very small correction for the force required to flatten it, will be the proper shim thickness. The sleeve 18 and the cheek 13 are then removed and replaced with the proper thickness of shim material substituted for the deformed wire, the external force is reapplied, the nut 24 is screwed up against the end of the sleeve 18, and the external force is removed.

While for the sake of clarity only one relatively thick shim has been shown in the drawing, the preferred form of the invention comprises the use of a plurality of identical thin shims, the adjustment being made by varying the number of shims.

If the teeth 18a and the notches in the collar 10a are made with sides parallel to the axis of the hub 10, as in the hub construction shown in my application Serial No. 90,679, issued as Patent No. 2,124,350, a modification of the above described method of assembly may be used. With such a construction, the sleeve 18 and the cheek plate 13 carried by it may be pressed towards the other cheek plate 12 with a force equal to the predetermined pressure, thus applying the predetermined pressure to the springing elements 20, and the nut 24 can then be screwed up snugly to maintain the predetermined pressure on the rubber springing elements 20 after the external pressure is removed.

What I claim is:

1. In a resilient wheel, a hub, a sleeve fitting over the hub, a pair of opposed members secured one to the hub and one to the sleeve, and means for fixing the sleeve to the hub including teeth on one end of the sleeve fitting into recesses in a shoulder on the hub, said teeth being tapered both in plan and in cross-section.

2. In a resilient wheel, a hub, a sleeve fitting over the hub, a pair of opposed members secured one to the hub and one to the sleeve, and means for fixing the sleeve to the hub including tapered teeth on one end of the sleeve fitting into recesses in a shoulder on the hub, the sides of each of said teeth lying in planes intersecting in a line not perpendicular to the axis of the hub.

3. In a resilient wheel, a hub, a sleeve fitting over the hub, a pair of opposed members secured one to the hub and one to the sleeve, means for fixing the sleeve to the hub including teeth on one end of the sleeve fitting into recesses in a shoulder on the hub, said teeth being tapered both in plan and cross section, and at least one shim between the side of one tooth and the opposed side of a recess for adjusting the position of the sleeve.

4. In a resilient wheel, a hub, a sleeve fitting over the hub, a pair of opposed members secured one to the hub and one to the sleeve, means for fixing the sleeve to the hub including tapered teeth on one end of the sleeve fitting into recesses in a shoulder on the hub, the sides of each of said teeth lying in planes intersecting in a line not perpendicular to the axis of the hub, and at least one shim interposed between the side of one tooth and the opposed side of a recess for adjusting the position of the sleeve.

5. In a resilient wheel, a hub, a sleeve fitting over the hub, a pair of opposed members secured one to the hub and one to the sleeve, means for fixing the sleeve to the hub including tapered teeth on one end of the sleeve fitting into recesses in a shoulder on the hub, the sides of each of said teeth lying in planes intersecting in a line not perpendicular to the axis of the hub, and shim material of equal thickness lying on both sides of each of said teeth between the opposed faces of the teeth and the recesses.

6. In a resilient wheel, a hub, a sleeve fitting over the hub, a pair of opposed members secured one to the hub and one to the sleeve, tapered teeth on one end of the sleeve fitting into tapered recesses in a shoulder on the hub, an annular member surrounding the hub and having a conical surface engaging a conical surface on the other end of the sleeve, and means for pressing the annular member against said other end of the sleeve.

7. In a resilient wheel, a hub, a sleeve fitting over the hub, a pair of opposed members secured one to the hub and one to the sleeve, tapered teeth on one end of the sleeve fitting into tapered recesses in a shoulder on the hub, and a nut on the hub having a conical surface engaging a conical surface on the other end of the sleeve.

8. In a resilient wheel, a hub, a sleeve fitting over the hub, a pair of opposed members secured one to the hub and one to the sleeve, tapered teeth on one end of the sleeve fitting into recesses in a shoulder on the hub, the sides of said teeth lying in planes intersecting in a line not in a plane perpendicular to the axis of the hub, an annular member surrounding the hub and having a conical surface engaging a conical surface on the other end of the sleeve, and means for pressing the annular member against the sleeve.

9. In a resilient wheel, a hub, a sleeve fitting over the hub, a pair of opposed members secured one to the hub and one to the sleeve, tapered teeth on one end of the sleeve fitting into recesses in a shoulder on the hub, the sides of said teeth lying in planes intersecting in a line not in a plane perpendicular to the axis of the hub, and a nut on the hub having a conical surface engaging a conical surface on the other end of the sleeve.

10. In combination, a hub, a sleeve fitting over the hub, tapered teeth on one end of the sleeve fitting into recesses in a shoulder on the hub, the sides of said teeth lying in planes intersecting in a line not in a plane perpendicular to the axis of the hub, shim material lying between the sides of the teeth and the opposed sides of the recesses, an annular member surrounding the hub and having a conical surface engaging a conical surface on the end of the sleeve away from the teeth, said conical surfaces being coaxial with the hub, and means for pressing the annular member against the sleeve.

CLARENCE F. HIRSHFELD.